US008325027B2

(12) United States Patent
Tee et al.

(10) Patent No.: US 8,325,027 B2
(45) Date of Patent: Dec. 4, 2012

(54) SAFETY LIGHT DEVICE

(75) Inventors: Alexander Kirby Tee, Cambridge, MA (US); Evan Isaac Timerding Gant, Medford, MA (US)

(73) Assignee: Lightlane LLC, Sommerville, MA (US)

( * ) Notice: Subject to any disclaimer, the term of this patent is extended or adjusted under 35 U.S.C. 154(b) by 395 days.

(21) Appl. No.: 12/774,129

(22) Filed: May 5, 2010

(65) Prior Publication Data

US 2010/0283590 A1 Nov. 11, 2010

Related U.S. Application Data

(60) Provisional application No. 61/176,726, filed on May 8, 2009.

(51) Int. Cl.
*B62J 3/00* (2006.01)
*G08B 5/00* (2006.01)
*G03B 21/00* (2006.01)

(52) U.S. Cl. ........ 340/432; 340/555; 340/557; 340/321; 340/815.4; 340/982; 340/985; 362/259; 362/473; 359/554; 353/11; 353/12; 353/13

(58) Field of Classification Search .................. 340/432, 340/982, 985
See application file for complete search history.

(56) References Cited

U.S. PATENT DOCUMENTS

| 2,201,078 A | 9/1937 | Bruington |
| 2,268,774 A | 1/1942 | Peterson |
| 5,719,568 A | 2/1998 | Adams |
| 6,220,737 B1* | 4/2001 | Baragona ...................... 362/540 |
| 6,733,134 B2 | 5/2004 | Bleiner |
| 7,175,321 B1* | 2/2007 | Lopez ........................... 362/496 |
| 7,192,172 B1 | 3/2007 | Alberti |
| 2003/0031008 A1 | 2/2003 | Kobayashi |
| 2003/0147247 A1 | 8/2003 | Koike |
| 2003/0174505 A1* | 9/2003 | Wainwright .................. 362/485 |
| 2004/0145900 A1 | 7/2004 | Camp |
| 2005/0099818 A1 | 5/2005 | Gropp et al. |
| 2007/0280503 A1 | 12/2007 | Kubota |
| 2007/0285934 A1 | 12/2007 | Carillo |
| 2008/0101079 A1 | 5/2008 | Kitamura |
| 2008/0106886 A1 | 5/2008 | Sugimoto |
| 2008/0219014 A1* | 9/2008 | Loibl ............................ 362/473 |
| 2008/0225271 A1 | 9/2008 | Ohmura |
| 2008/0239698 A1 | 10/2008 | Ibrahim |
| 2010/0253919 A1* | 10/2010 | Douglas ......................... 353/13 |

FOREIGN PATENT DOCUMENTS

WO WO 2007/036024 4/2007

* cited by examiner

*Primary Examiner* — Donnie Crosland
(74) *Attorney, Agent, or Firm* — Occhiuti Rohlicek & Tsao LLP

(57) ABSTRACT

A safety light apparatus includes a first light source to emit a first light beam and a first light modulator to modulate the first light beam to project a first light image resembling a left boundary of a bike lane. A second light source emits a second light beam, and a second light modulator modulates the second light beam to project a second light image resembling a right boundary of a bike lane. A housing supports the first and second light sources and the first and second light modulators. A mounting device is provided for mounting the housing to a bicycle.

30 Claims, 14 Drawing Sheets

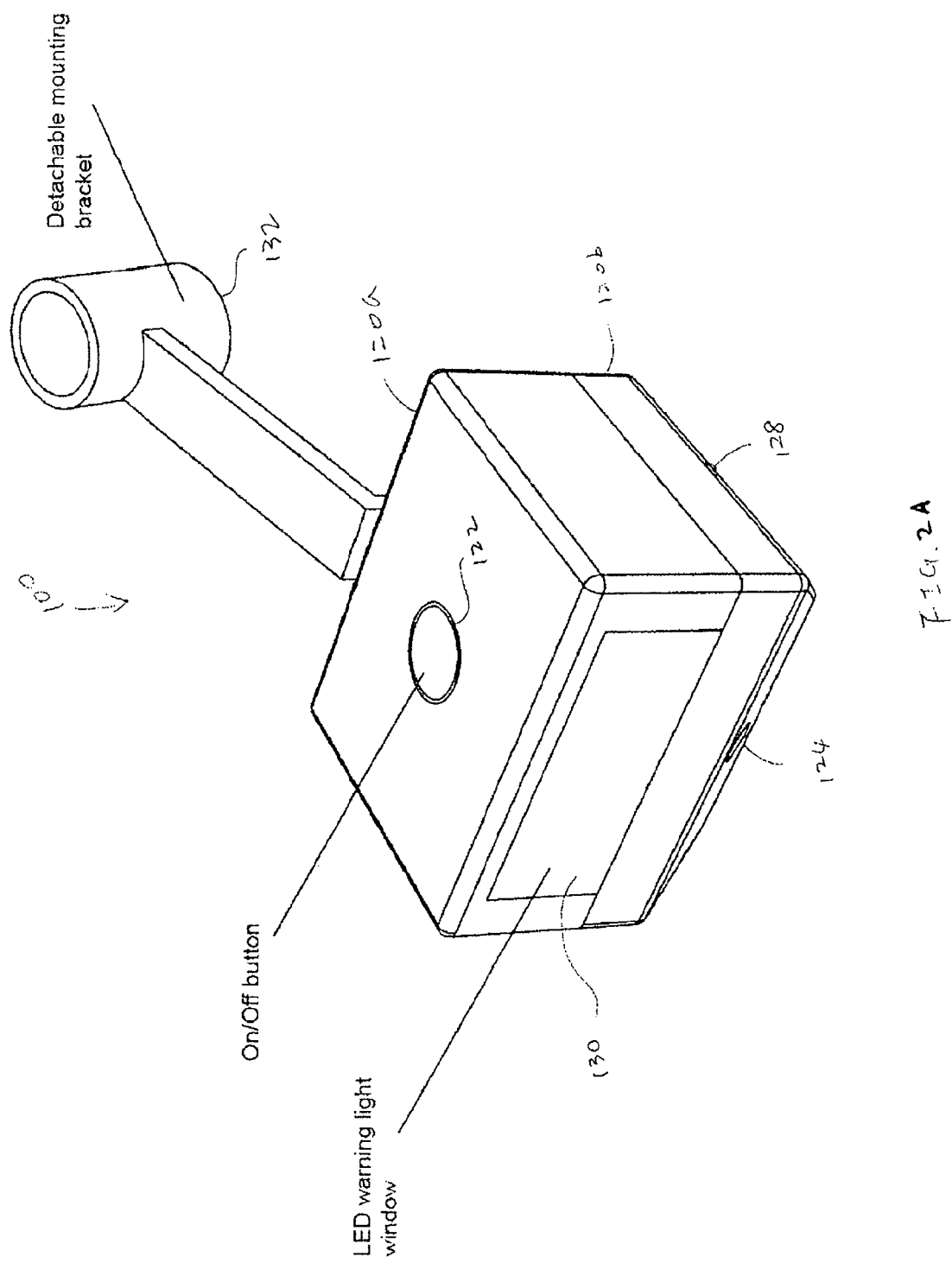

Ridges in the lens refocus a single beam of light into a line.

SAFETY LIGHT DEVICE

RELATED APPLICATIONS

This application claims the benefit of the priority date of U.S. Provisional Application 61/176,726, filed on May 8, 2009, the contents of which are herein incorporated by reference.

BACKGROUND

This description relates to safety light devices, and in particular, to bicycle safety light devices.

Many people ride bicycles during the evening or night time when visibility is poor. A tail light can be mounted near the rear of a bicycle to emit light that catches the attention of vehicle drivers behind the bicycle to reduce the chances of accidents.

SUMMARY

In general, in one aspect, a safety light apparatus includes a first light source to emit a first light beam, a first light modulator to modulate the first light beam to project a first light image resembling a left boundary of a travel lane, such as a bike lane, a second light source to emit a second light beam, a second light modulator to modulate the second light beam to project a second light image resembling a right boundary of a bike lane, and a housing to support the first and second light sources and the first and second light modulators.

Implementations of the safety light apparatus may include one or more of the following features. The apparatus may include a stabilizer to stabilize movements of the first and second light sources and the first and second light modulators to reduce movements of the projected left and right bike lane boundaries when the bicycle tilts at an angle relative to a vertical direction. The stabilizer may cause the first and second light sources and the first and second light modulators to rotate about an axis to counteract the tilt of the bicycle.

The apparatus may include a third light source to emit a third light beam, and a third light modulator to modulate the third light beam to project a third light image resembling a bike lane icon.

The apparatus may include a third light source to emit a third light beam, and a third light modulator that is reconfigurable to modulate the third light beam to project a third light image representing a user-defined pattern. The apparatus may include a location sensor to detect a location of the safety light apparatus, and a controller to control at least one of the third light source or the third light modulator to adjust a parameter of the third light image based on the location.

The apparatus may include a third light source to generate a light signal that indicates a position of the safety light apparatus. The third light source may include a tail light.

The mounting device may include a mounting bracket for mounting to a seat tube, a mounting bracket for mounting to a bike handle, or an accessory for mounting to a recumbent bicycle. Or the mounting device may be formed from a part of a bicycle frame, in which case the device is effectively integrated into the frame.

The mounting device may include mounting mechanism for mounting to at least one of a child's bicycle, a wheel chair, a Segway personal transporter, a helmet, a pannier rack, a skateboard, or a tricycle.

At least one of the first or second light modulators may include a first portion that is transparent to the corresponding light beam and a second portion that is opaque to the corresponding light beam, the first portion having a pattern corresponding to the projected light image.

At least one of the first or second light modulators may include a scanning device that scans the corresponding light beam to project the light image.

At least one of the first or second light modulators may include a reflective surface having ridges to reflect the corresponding light beam to form the left or right bike lane boundary image.

At least one of the first or second light sources may include a light emitting diode or a laser.

The apparatus may include a location sensor to detect a location of the safety light apparatus, and a controller to control at least one of the first light source, the first light modulator, the second light source, or the second light modulator to adjust a parameter of the first light image or the second light image based on the location.

The apparatus may include a tilt safety sensor to sense an amount of tilt of the safety light apparatus and cause at least one of the first light source or the second light source to be dimmed or turned off when the safety light apparatus is tilted at an angle beyond a threshold value.

The apparatus may include a mechanism for adjusting at least one of a projection angle for the first light image, a length of the first light image, or a distance between the first and second light images.

The apparatus may include an accelerometer to detect movements of the bicycle, and a controller to control at least one of the projected left or right bike lane boundary based on outputs from the accelerometer. The controller may blink the projected left bike lane boundary when the accelerometer detects that the bicycle tilts left beyond a threshold degree. The controller may blink the projected right bike lane boundary when the accelerometer detects that the bicycle tilts right beyond a threshold degree. The controller may increase the intensity of at least one of the projected left or right bike lane boundary when the accelerometer detects that the bicycle decelerates beyond a threshold rate.

The apparatus may include a controller to control at least one of the projected left or right bike lane boundary based on a signal indicating whether the bicycle has a speed above or below a threshold. The controller increases the brightness of at least one of the projected left or right bike lane boundary when the signal indicates that the bicycle has a speed below the threshold.

The apparatus may include a light sensor that senses light coming from behind the bicycle, and a controller to control at least one of the projected left or right bike lane boundary based on outputs from the light sensor. The controller may increase the brightness of at least one of the projected left or right bike lane boundary when the light sensor senses light beyond a threshold brightness.

The apparatus may include a controller to cause the projected left bike lane boundary to blink or change brightness in response to a first control signal, and cause the projected right bike lane boundary to blink or change brightness in response to a second control signal. The apparatus of may include a user input device to generate the first and second control signals, the user input device being configured to receive inputs from a rider of the bicycle.

In general, in another aspect, a bicycle safety light apparatus includes a projector to project a first light image resembling a left boundary of a bike lane and a second light image resembling a right boundary of a bike lane; and a controller to control the projected left bike lane boundary and the right bike lane boundary based on sensor input indicating a condition of a bicycle to which the safety light apparatus is mounted.

Implementations of the apparatus may include one or more of the following features. The controller blinks or changes brightness of the projected left bike lane boundary in response to sensor input indicating that the bicycle tilts left beyond a threshold degree.

The controller blinks or changes brightness of the projected right bike lane boundary in response to sensor input indicating that the bicycle tilts right beyond a threshold degree.

The controller blinks or changes brightness of both the projected left and right bike lane boundaries in response to sensor input indicating that the bicycle has a speed below a threshold or is decelerating beyond a threshold rate.

The controller increases a brightness of at least one of the projected left or right bike lane boundary in response to sensor input indicating that light coming from the rear of the bicycle is beyond a threshold brightness.

In general, in another aspect, a bicycle includes an accelerometer; a speedometer; a location sensor; a light sensor; a projector to project a first light image resembling a left boundary of a bike lane and a second light image resembling a right boundary of a bike lane; and a controller to control the projected left bike lane boundary and the right bike lane boundary based on output signals from the accelerometer, the speedometer, the location sensor, and the light sensor.

Implementations of the apparatus may include one or more of the following features. The controller may blink or change the brightness of the projected left or right bike lane boundary in response to output signals from the accelerometer indicating that the bicycle tilts left or right, respectively, beyond a threshold degree.

The controller may blink or change the brightness of both the projected left and right bike lane boundaries in response to output signals from the speedometer or accelerometer indicating that the bicycle has a speed below a threshold or is decelerating beyond a threshold rate, respectively.

The controller may increase the brightness of at least one of the projected left or right bike lane boundary in response to output signals from the light sensor indicating that light coming from the rear of the bicycle is beyond a threshold brightness.

In general, in another aspect, a method includes projecting a first light beam from a first light source attached to a bicycle, modulating the first light beam to project a first light image resembling a left boundary of a bike lane, projecting a second light beam using a second light source attached to the bicycle, and modulating the second light beam to project a second light image resembling a right boundary of a bike lane.

Implementations of the method may include one or more of the following features. The method may include projecting a third light beam from a third light source attached to the bicycle, and modulating the third light beam to project a third light image resembling a bike lane icon.

The method may include stabilizing movements of the first, second, and third light images when the bicycle tilts at an angle relative to a vertical direction. Stabilizing movements of the first, second, and third light images may include rotating the light sources about an axis to counteract the tilt of the bicycle.

The method may include stabilizing movements of the first and second light images when the bicycle tilts at an angle relative to a vertical direction. Stabilizing movements of the first and second light images may include rotating the light sources about an axis to counteract the tilt of the bicycle.

The method may include generating a light signal using a third light source attached to the bicycle to indicate a position of the bicycle.

Projecting the first and second light beams may include projecting the first and second light beams from a location behind a seat tube of the bicycle.

At least one of modulating the first light beam or the second light beam may include blocking a first portion of the light beam and passing a second portion of the light beam to form the projected light image, or scanning the light beam to project the light image.

At least one of projecting the first light beam or the second light beam may include projecting the light beam from a light emitting diode or projecting a laser beam.

In general, in another aspect, an apparatus includes light sources to emit light beams, means for modulating the light beams to project a first light image resembling a left boundary of a bike lane and a second light image resembling a right boundary of a bike lane, and a housing to support the light sources and the modulating means, the housing having a mounting device for mounting the housing to a bicycle.

Implementations of the apparatus may include one or more of the following features. The apparatus may include a stabilizer to stabilize movements of the light sources and the modulating means to reduce movements of the left and right boundaries of the projected bike lane when the bicycle tilts at an angle relative to a vertical direction.

The modulating means may modulate the light beams to project a third light image resembling a bike lane icon.

In general, in another aspect, a personal transportation device includes at least one light sources to emit at least one light beam, at least one spatial light modulators to modulate the at least one light beam to project at least one light image toward a surface on which the personal transportation device travels, a location sensor to sense a location of the personal transportation device, and a controller to control the at least one light source or the at least one spatial light modulator to adjust at least one parameter of the at least one light image based on the location of the personal transportation device.

In general, in another aspect, a method of operating a personal transportation device includes generating at least one light beam, modulating the at least one light beam to project at least one light image toward a surface on which the personal transportation device travels, sensing a location of the personal transportation device, and controlling at least one parameter of the at least one light image based on the location of the personal transportation device.

These and other aspects and features, and combinations of them, may be expressed as methods, apparatus, systems, means for performing functions, program products, and in other ways.

Advantages of the aspects, systems, and methods may include one or more of the following. A realistic bike lane image that is easily recognizable by vehicle drivers can be provided to cause the drivers to maintain safe distances from a bicycle and its rider. User can project light images on the road while riding a bike or jogging. The light images can include, e.g., advertisements. Bikers and joggers can earn money from projecting light images of advertisements while riding bicycles and jogging.

DESCRIPTION OF DRAWINGS

FIGS. 2A and 2B are diagrams of example bicycle safety light devices.

DETAILED DESCRIPTION

Figure 1A:
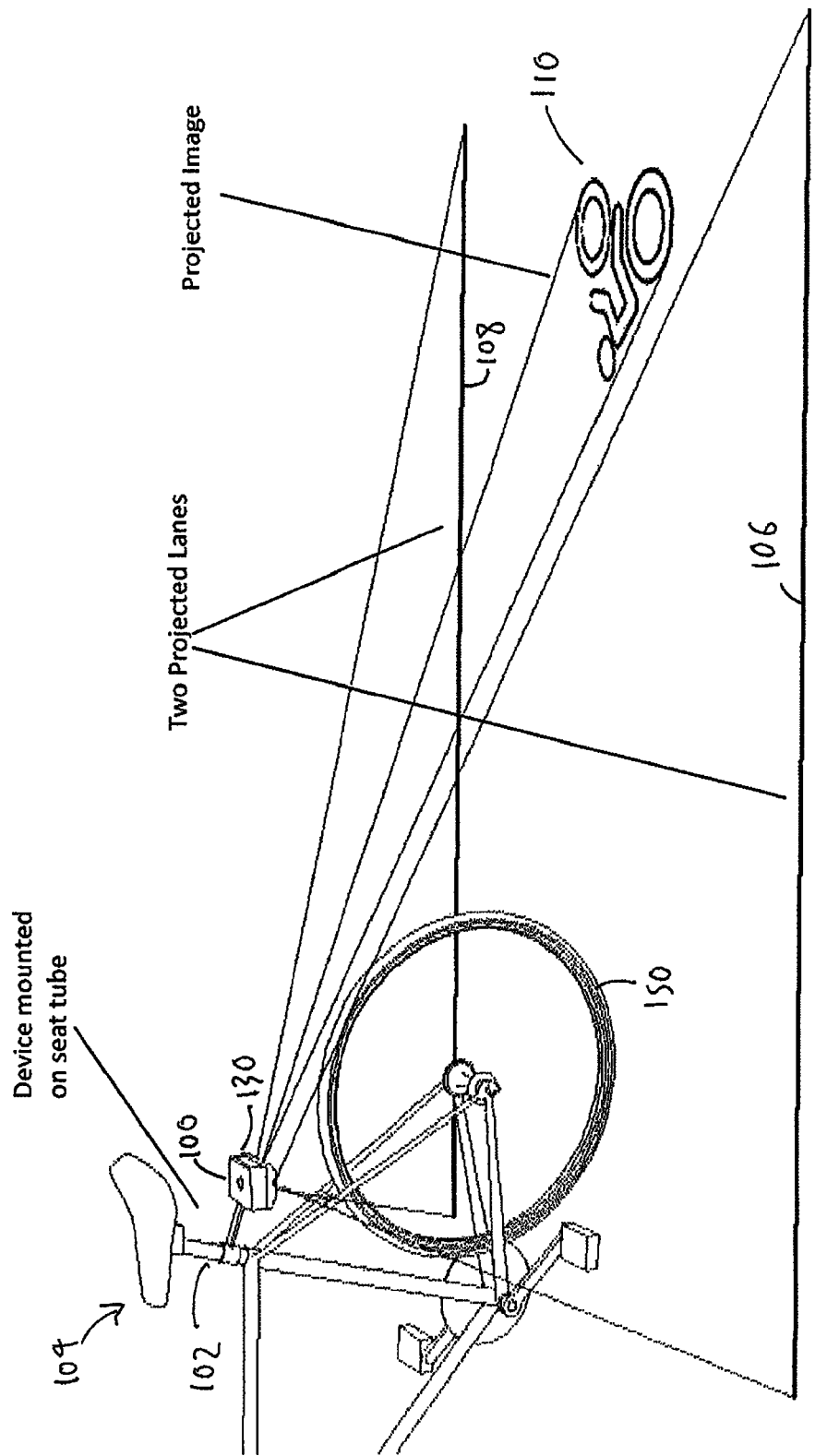
FIGS. 1 and 1B are diagrams of a bicycles having an example safety light device that projects light images.

Referring to FIG. 1A, in some implementations, a bicycle safety light device 100 mounted on a bicycle projects light images that resemble left and right travel lane boundaries. In some embodiments, the device 100 also projects a light image 110. The image can be a bike lane icon is easily recognized by vehicle drivers and causes the drivers to maintain safe distances from the bicycle and its rider. However, the content of the projected image can, in some embodiments, be altered.

In one embodiment, shown in FIG. 1A, the safety light device 100 is mounted on a seat tube 102 of a bicycle 104. In an alternative embodiment, shown in FIG. 1B, the safety light device 100 is integral with a frame of the bicycle 104 just under the seat tube 102. More generally, the safety light device 100 can be integrated into any portion of the bicycle superstructure, such as a seat post, the seat itself, the handlebars, a bicycle rack, or fork.

The bicycle safety light device 100 projects a left lane boundary 106, a right lane boundary 108, thus defining a light lane. Optionally, the device 100 projects a bike lane icon 110 (or other image) to provide an easily recognizable visual cue for warning drivers behind the bicycle 104 to proceed with caution. Because the projected bike lane is easily recognizable, drivers behind the bicycle can react quickly upon seeing the projected bike lane. This reduces the chances of accidents. This feature is particularly advantageous on a road in which vehicles travel at high speeds. On such roads, even a fraction of a second of additional reaction time may mean the difference between an accident, and a merely alarming experience.

By comparison, if only a single line (e.g., only the left bike lane boundary) were projected on the road, it may take a driver who has not seen such a projected line on a road a longer time to realize the significance of the single line, reducing the amount of time that the driver can react to avoid the bicycle 104 and its driver.

In some examples, the left and right lane boundaries 106, 108 extend parallel to a plane defined by the rear wheel 150 (the plane being perpendicular to the axis of the rear wheel 150). The left and right lane boundaries 106, 108 can have equal distances to the rear wheel 150. In other examples, the lines can extend in a direction that makes a small angle relative to the plane, thus generating a lane that narrows in one direction.

Figure 1B:
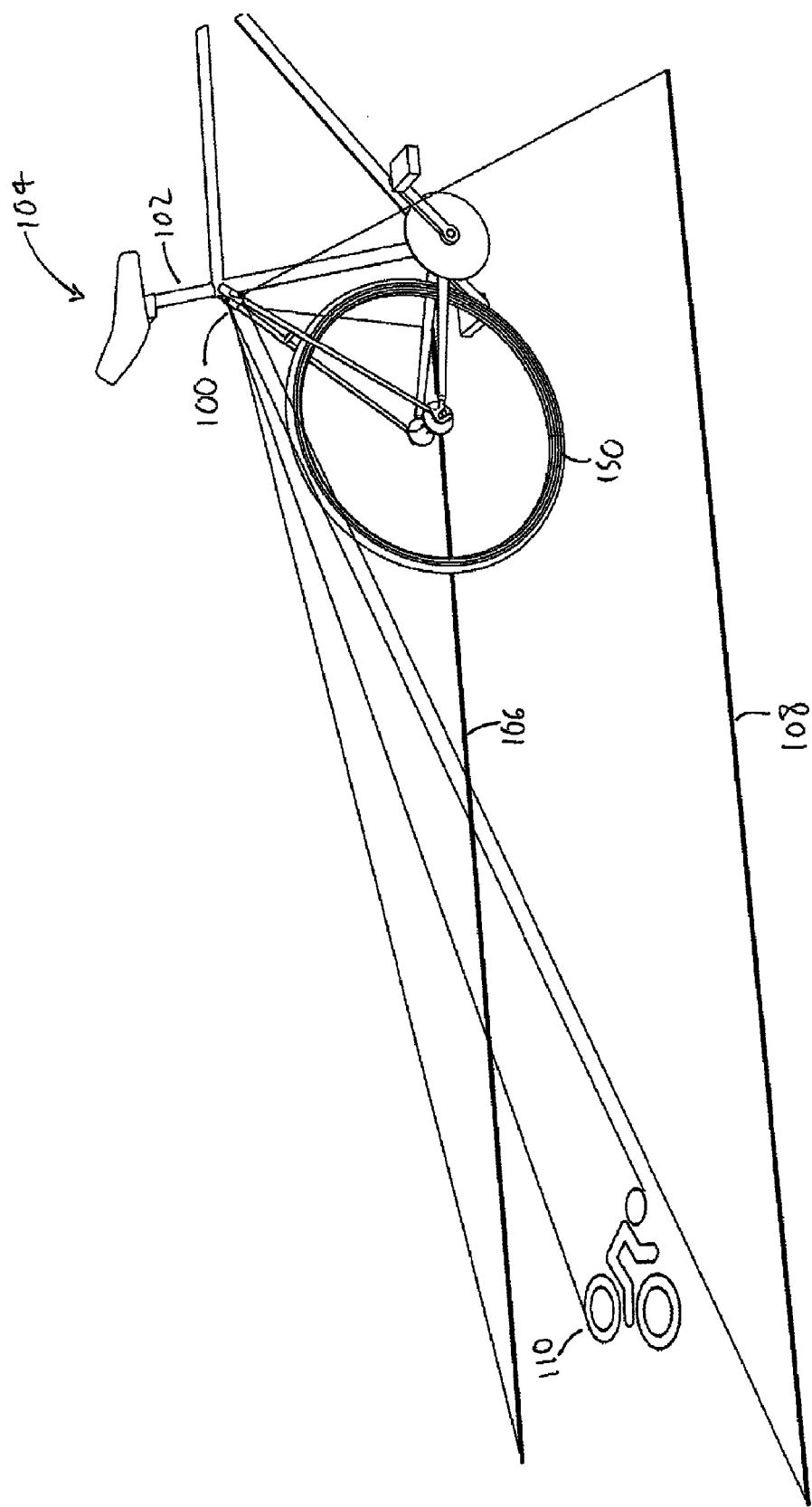

In the embodiments shown in FIGS. 1A and 1B, the bicycle safety light device 100 projects the images towards the sides and rear of the bicycle 104. The safety light device 100 can also be mounted on or integrated into the front of the bicycle 104 or a structure attached to the bicycle 104 to project images toward the sides and front of the bicycle 104. In some examples, two safety light devices 100 are used: one device to project images toward the front and sides of the bicycle 104; and the other device to project images toward the rear and sides of the bicycle 104. This results in a light lane that extends from a few feet behind the bicycle 104 to a few feet in front of the bicycle 104. The resulting lane provides a highly visible cue to drivers approaching the bicycle, whether from the front or the rear, and serves to alert the drivers to the presence of the bicycle and its rider.

The bicycle safety light device 100 may include a warning light 130 that projects diffused light to further attract the drivers' attention. The warning light 130 indicates the location of the bicycle 104. The warning light 130 can be turned on continuously, or blink periodically or even randomly. Or a plurality of such lights can be provided and programmed to flash in a sequence.

Referring to FIG. 2A, in some implementations, the bicycle safety light device 100 includes a top housing 120a and a lower housing 120b (collectively referred to as housing 120) that together enclose various components of the safety light device 100, such as light emitting devices, a battery or other power source, and control circuitry.

A detachable mounting bracket 132 is provided for mounting the safety light device 100 to the seat tube 102. Other mounting mechanisms can also be used. Or in some embodiments, the entire device 100 is integrated into the the bicycle superstructure (e.g. the frame, seat, seat post, handlebar, rack, or any structure attached to one of the foregoing), thus eliminating the need for a mounting mechanism.

An on/off button 122 is provided to allow the user to turn the safety light device 100 on or off. The lower housing 120b includes a lower rear projection window 124 that allows an image to be projected on the road, to the rear of the bicycle 104. A left side window 126 (obscured from view in FIG. 2A but is visible in FIG. 3) allows the left lane boundary 106 to be projected on the road, and a right side window 128 allows the right lane boundary 108 to be projected on the road. A warning light window 130 allows transmission of a warning light indicating the location of the bicycle 104.

In some examples, the on/off button 122 also functions as a mode selection button. In such examples, repeatedly pressing the on/off button 122 selects among various operation modes. For example, the safety light device 100 may have the following operation modes: (1) warning light; (2) left and right lane boundaries plus lane icon; (3) warning light plus left and right bicycle lane boundaries and lane icon; (4) power remaining; and (5) off.

Figure 2B:
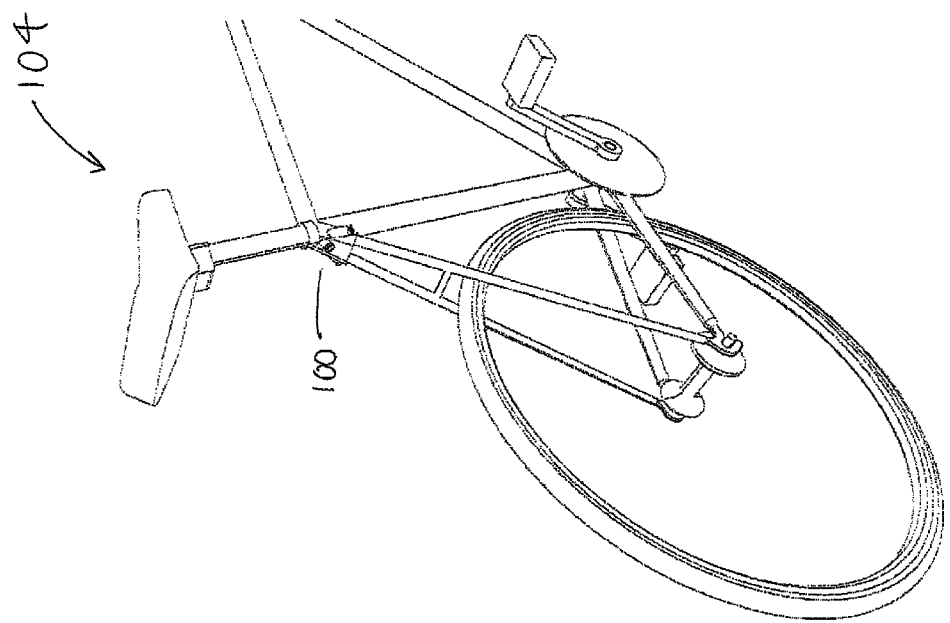

In an alternative embodiment, shown in FIG. 2B, the light device 100 is integrated into the frame of the bicycle 104 just under the bicycle seat. However, the device 100 can also be integrated into any portion of the bicycle's superstructure, including the seat, seat post, a fork, a rack, the handlebars, or any other structure attached to any of the foregoing.

Figure 3:
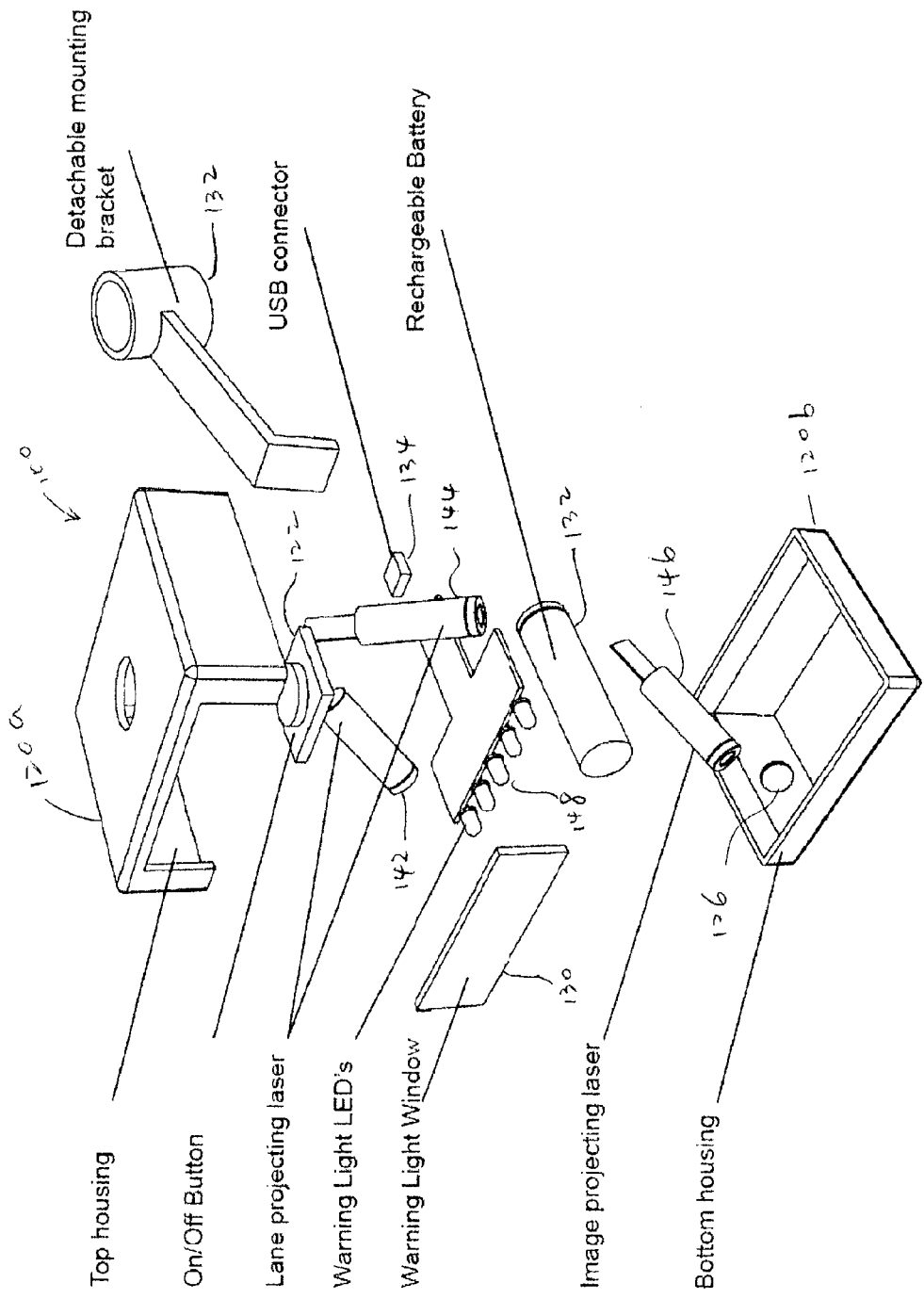
FIG. 3 is an exploded diagram of the bicycle safety light device.

FIG. 3 shows an exploded diagram of the bicycle safety light device 100. The device 100 includes the top housing 120a, the lower housing 120b, and the on/off button 122. A left lane projecting laser 142 generates a first laser beam for projecting the left lane boundary 106, a right lane projecting laser 144 generates a second laser beam for projecting the right lane boundary 108, and an image projecting laser 146 generates a third laser beam for projecting the lane icon 110. In some embodiments, the lasers 142, 144, and 146 are diode lasers. The lasers can have any color. However, green lasers provide particularly good visibility, especially in urban areas.

The warning light window 130, which may have a diffuser to diffuse light in various directions, is illuminated by Light emitting diodes (LEDs) 148. The LEDs 148 can have one or more colors. A power source provides power to the lasers 142, 144, 146, LEDs 148, and other electronic components. In some examples, the power source is a battery 132. In some cases, the battery 132 can be recharged by the pedaling motion of the bike rider. Other examples include a capacitor used in parallel to or in lieu of a battery 132. In some embodiments, the power source, either battery or capacitor, can be charged by a generator powered by the pedaling motion.

In some implementations, a spatial light modulator is placed in front of each of the lane projecting lasers 142, 144 to modulate the laser beams for projecting the left or right lane boundaries. One example of a spatial light modulator is made from a dark film having a transparent slit. A laser beam passing through the transparent slit, forms a light image of a lane boundary.

Figure 10:
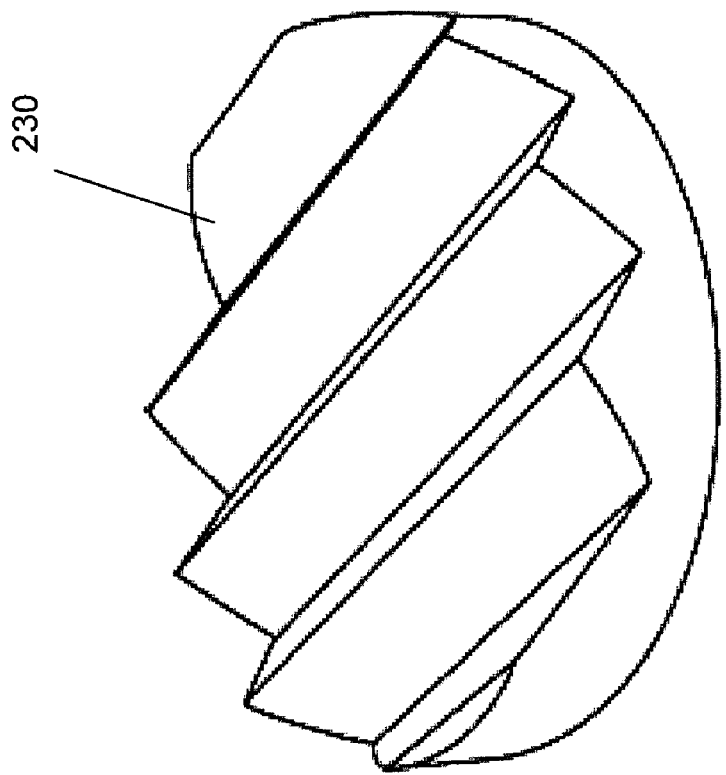
FIG. 10 is a diagram of a lens having ridges.

In other implementations, the lane projecting lasers 142 and 144 are each modulated by a lens 230 (shown in FIG. 10) having small ridges that redirect or refocus the laser beam into a line representing the left or right lane boundary.

In some examples, a user-configurable spatial light modulator modulates the laser beam projected by the image projecting laser 146. For example, a liquid crystal spatial light modulator can be placed in front of the image projecting laser 146 to modulate the third laser beam. This causes an image shown on the liquid crystal spatial light modulator to be projected on the road. A flash memory stores the image data, and a universal serial bus (USB) port 134 allows the user to upload the image data to the flash memory.

By using a user-configurable spatial light modulator, the bike rider can use the safety light device 100 to project various images on the road. For example, the image may include text and/or graphics. The image can show, e.g., a slogan or sponsored content, such as an advertisement. The bike rider can earn money from projecting advertisements while riding the bicycle 104. In some examples, the user may upload several images to the flash memory of safety light device 100. The safety light device 100 may have additional buttons, or a keypad, for selecting the images. A controller may control the spatial light modulator to show different images over time.

In some implementations, the bike rider may control the lane projecting lasers 142 and 144, and the image projecting laser 146 to adjust the projected images in such a way as to signal turning or braking of the bicycle 104. A control input device, such as a lever or button, can be mounted on the handle to allow the bike rider to control the safety light device 100 by causing the projected left lane boundary 106 to blink when the rider turns left and causing projected right lane boundary 108 to blink when the rider turns right. The safety light device 100 may be linked to the bicycle brake system such that the projected images change when braking. For example, when the rider applies the bicycle brake, the safety light device 100 may cause the projected left and right lane boundaries and the projected lane icon 110 to blink or to increase brightness. This way, the projected lane boundaries and the projected icon can be used as turning and braking signals.

In some implementations, the safety light device 100 may include or be coupled to, an accelerometer that can detect tilting and decelerating of the bicycle 104. A controller controls the lasers 142, 144, and 146 based on the outputs of the accelerometer. For example, when the bicycle tilts left or right beyond a preset angle, the controller causes the projected left or right lane boundary 106 or 108, respectively, to blink. When the bicycle decelerates beyond a threshold rate, the controller causes the projected left and right lane boundaries 106 and 108 and the projected lane icon 110 to blink, increase their brightness, or to otherwise indicate deceleration.

In some examples, the projected lane boundaries 106, 108 and/or the projected icon 110 may be adjusted when the bicycle 104 comes to a stop or when the speed falls below a threshold. For example, when the bicycle 104 comes to a stop, the lane boundaries 106, 108 may shift outward relative to the bicycle 104 to represent a wider lane, thus forming a larger protection zone around the bicycle 104. The projected lane boundaries 106, 108, and/or the projected icon 110 may shift or extend farther back from the bicycle 104 to form a longer protection zone behind the bicycle 104. Or, the projected lane boundaries 106, 108, and the projected icon 110 may become brighter.

The safety light device 100 may include, or be coupled to a light sensor that is oriented to detect light projected from behind the bicycle 104. Such a sensor would detect headlights from vehicles behind the bicycle 104. When the light sensor detects light above a threshold (which may indicate proximity of the vehicles), the safety light device 100 increases the intensity of the lasers 142, 144, and 146, or causes the lasers 142, 144, and 146 to blink so that the projected lane boundaries 106, 108 and the projected icon 100 are not drowned out by the headlights, helping to alert the drivers when they are getting close to the bike rider.

In some implementations, the safety light device 100 may include a location sensor that determines location based on global positioning system (GPS) signals, Wi-Fi signals, or mobile phone network tower signals. The safety light device 100 may include a database showing the local roads and relevant information, such as the speed limits of the roads, and whether there are actual lanes on the road. The safety light device 100 may project different images based on the location. For example, the images may change as the bicycle 104 travels through different neighborhoods, towns, or cities. The safety light device 100 may project different advertisements based on its location.

For example, if the safety light device 100 detects that it is located on a road where the speed limit is high, it may increase laser power and project brighter images, project bike lane boundaries that are longer and extend further back from the bicycle 104, project bike lane boundaries that are wider apart, or a combination of the above. This way, drivers of fast vehicles can see the projected bike lane from a greater distance and can have more reaction time to avoid hitting the bicycle 104. Conversely, if the safety light device 100 detects that it is located on a road where the speed limit is low, it may decrease laser power and project dimmer and shorter bike lane boundaries to preserve battery power.

For example, if the safety light device 100 detects that it is located on a dedicated bike trail where there is no car traffic, the safety light device 100 may switch off the lasers projecting the left and right bike lane boundaries, but keep the warning light LEDs 148 turned on. In examples where both front and rear safety light devices are used, the front safety light device may turn off the lasers until it detects that it is located on a narrow road such that there is danger of collision from oncoming cars, then the front safety light device turns on the lasers automatically.

In some implementations, the user can pre-configure the safety light device 100 to project different images and/or with different brightness at different locations, and upload the configuration data to the safety light device 100. For example, an application software may be executed on a personal computer. The software may show a map and allow the user to specify various parameters for the device 100 based on location, such as what images to shown and how bright the images are at various regions. The configuration data may be transmitted from the personal computer to the safety light device 100 through the USB port 134.

Figure 4:
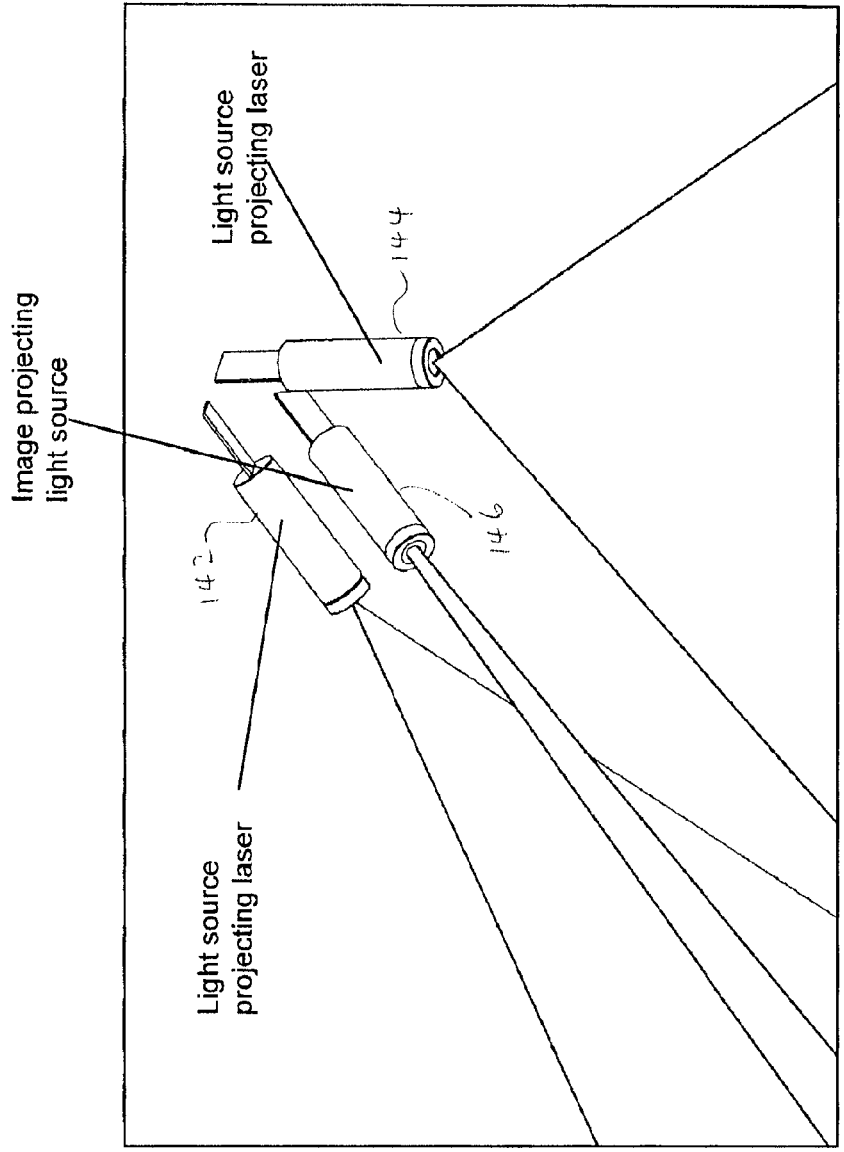
FIG. 4 is a diagram showing orientations of various projecting lasers.

FIG. 4 is a diagram showing the orientations of the left lane projecting laser 142, the right lane projecting laser 144, and the image projecting laser 146. The lasers 142, 144, and 146 can be held in place by support structures (not shown) connected to the top housing 120a and the lower housing 120b.

Figure 5:
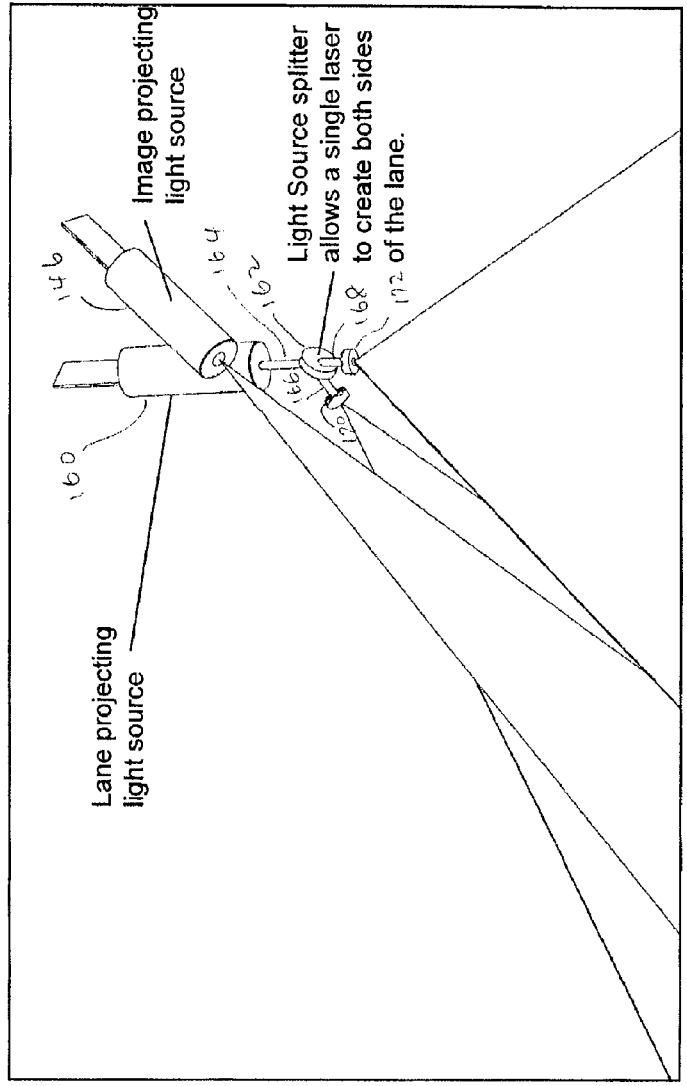
FIG. 5 is a diagram of example projecting lasers.

Referring to FIG. 5, in some implementations, the left and right bike lane boundaries 106, 108 can be generated using a single laser 160 that generates a laser beam 164, and a beam splitter 162 that splits the laser beam 164 into two beams 166 and 168. Spatial light modulators 170 and 172 modulate the laser beams 166 and 168, respectively, to generate the images for the left and right bike lane boundaries 106, 108.

Figure 6:
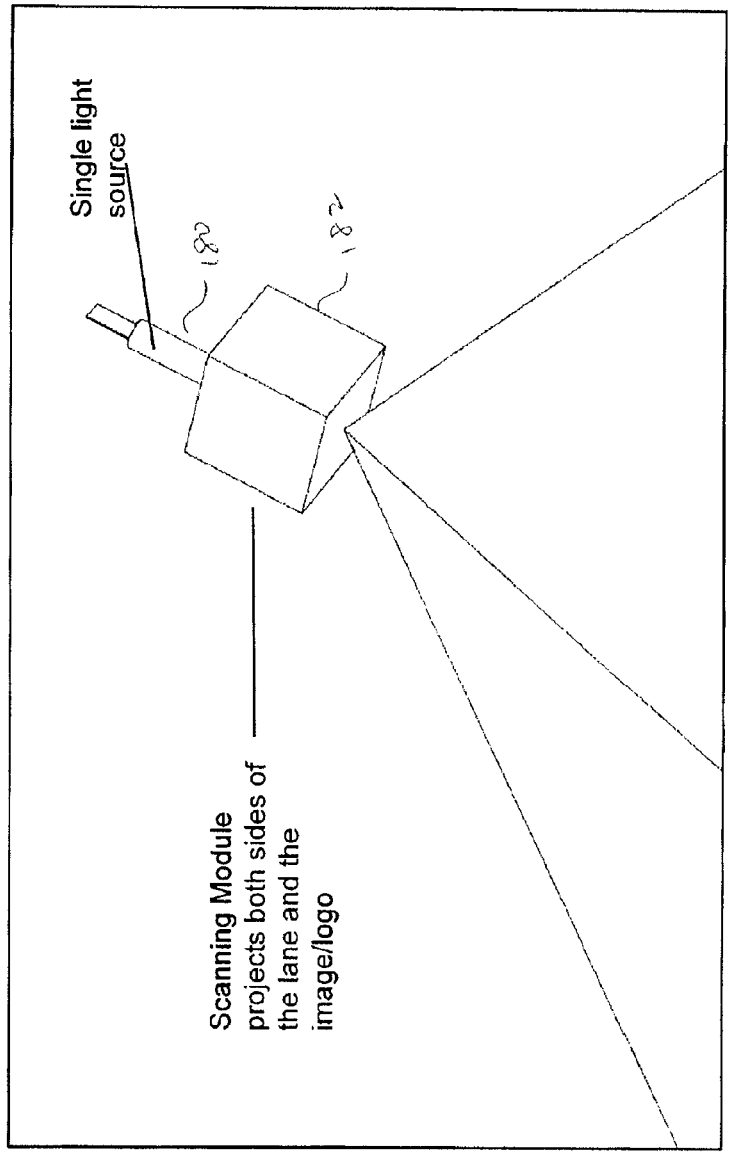
FIG. 6 is a diagram of a laser and a scanning module.

Referring to FIG. 6, in some implementations, a single laser 180 is used, and a scanning module 182 having a scanning mirror scans a laser beam from the laser 180 to generate the images for the left and right bike lane boundaries 106, 108 and the bike lane icon 110. The scanning motion of the scanning mirror can be controlled by a microcontroller based on image data, which can be up-loaded through the USB port 134.

Figure 7:
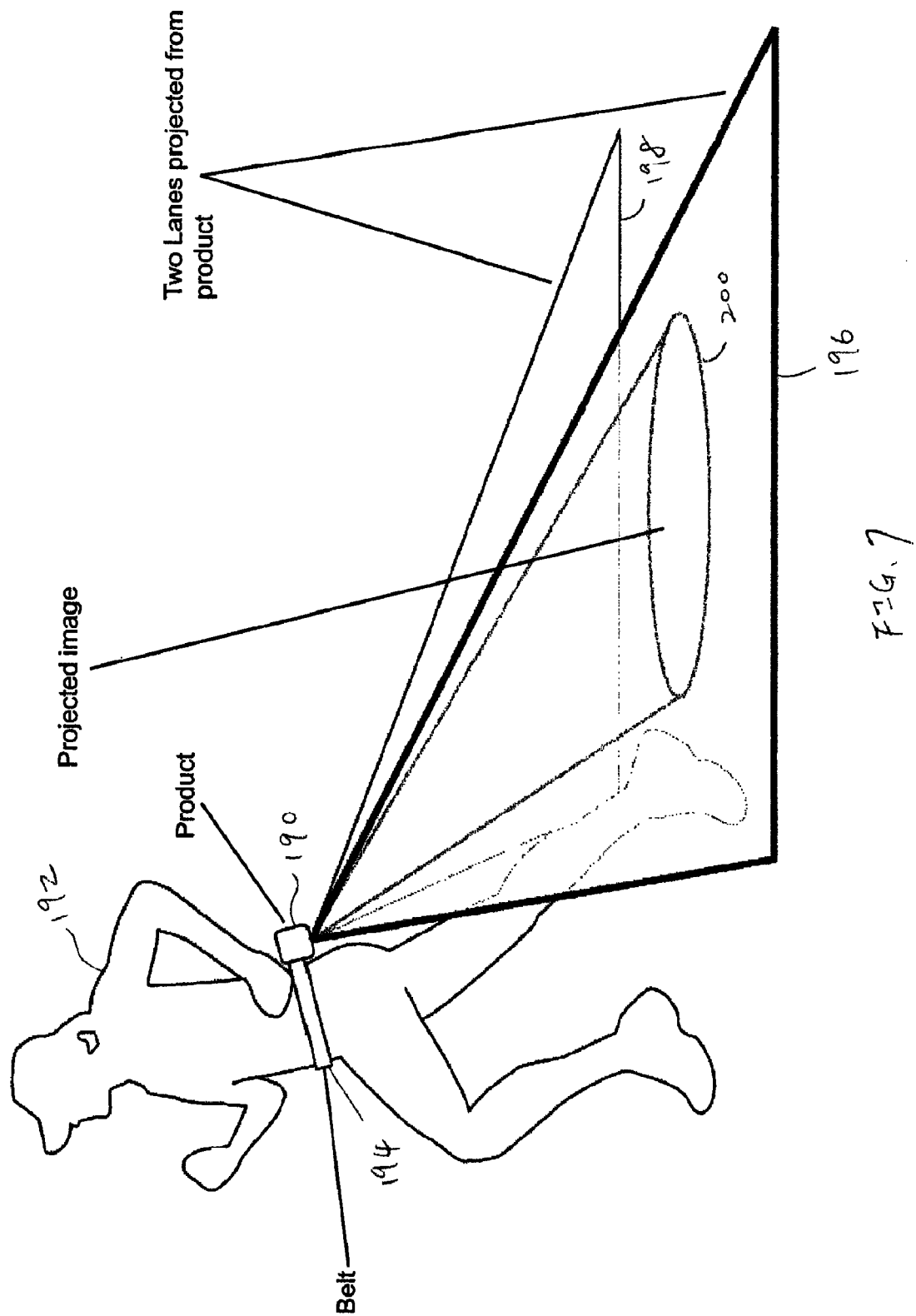
FIG. 7 is a diagram of an example personal safety light device.

Referring to FIG. 7, in some implementations, a personal safety light device 190 can have a configuration similar to the bicycle safety light device 100, except that the personal safety light device 190 is attached to a belt 194 that can be worn by a user. The personal safety light device 190 may be useful when, e.g., jogging at night. The personal safety light device 190 can project a left jogging lane boundary 196, a right jogging lane boundary 198, and optionally, an image 200. The image 200 can be, e.g., a slogan or sponsored content, such as an advertisement. The jogger can earn money from projecting advertisements while jogging.

The personal safety light device 190 can have a stabilization device that stabilizes the projected images as the jogger's body moves up and down when jogging.

Figure 8:
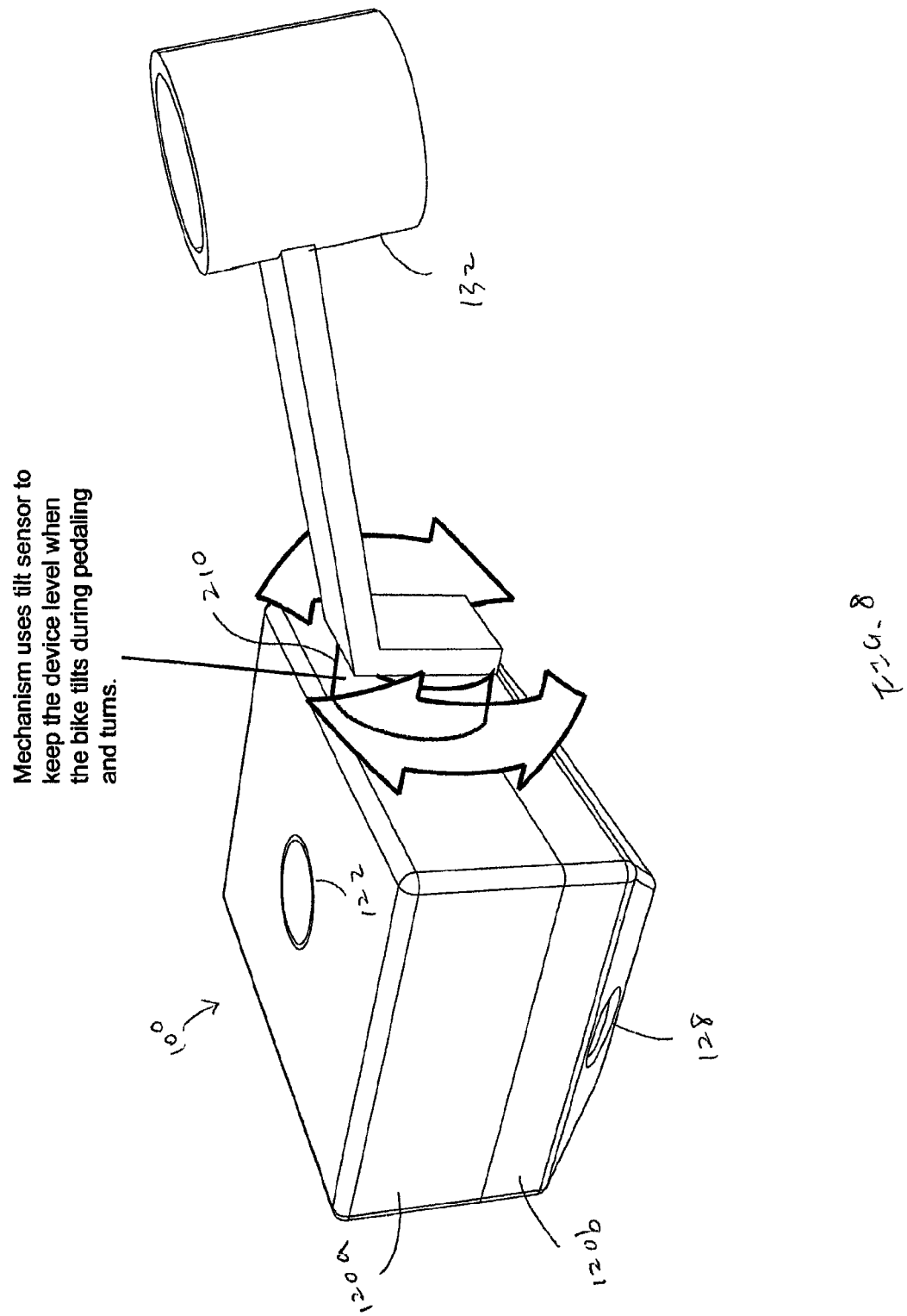
FIG. 8 is a diagram of an example safety light device having a stabilization device.

Referring to FIG. 8, in some implementations, a stabilization device 210 may be provided to stabilize the safety light device 100 as the bicycle 104 tilts left or right when turning. The stabilization device 210 may include a tilt sensor that senses the amount of tilt, and counteracts the tilting to stabilize the safety light device 100. This allows the distance between the projected left and right bike lane boundaries 106, 108 and the rear wheel 150 to remain relatively constant. For example, when the bicycle 104 turns right, the stabilization device 210 may cause the safety light device 100 to rotate slightly counterclockwise (when viewed from the rear toward the front of the bicycle 104). When the bicycle 104 turns left, the stabilization device 210 may cause the safety light device 100 to rotate slightly clockwise (when viewed from the rear toward the front of the bicycle 104). In some implementations, the stabilization device 210 keeps the safety light device 100 level at all times so that the orientation of the safety light device 100 remains the same relative to the road regardless of the angle of tilt of the bicycle 104.

Figure 9:
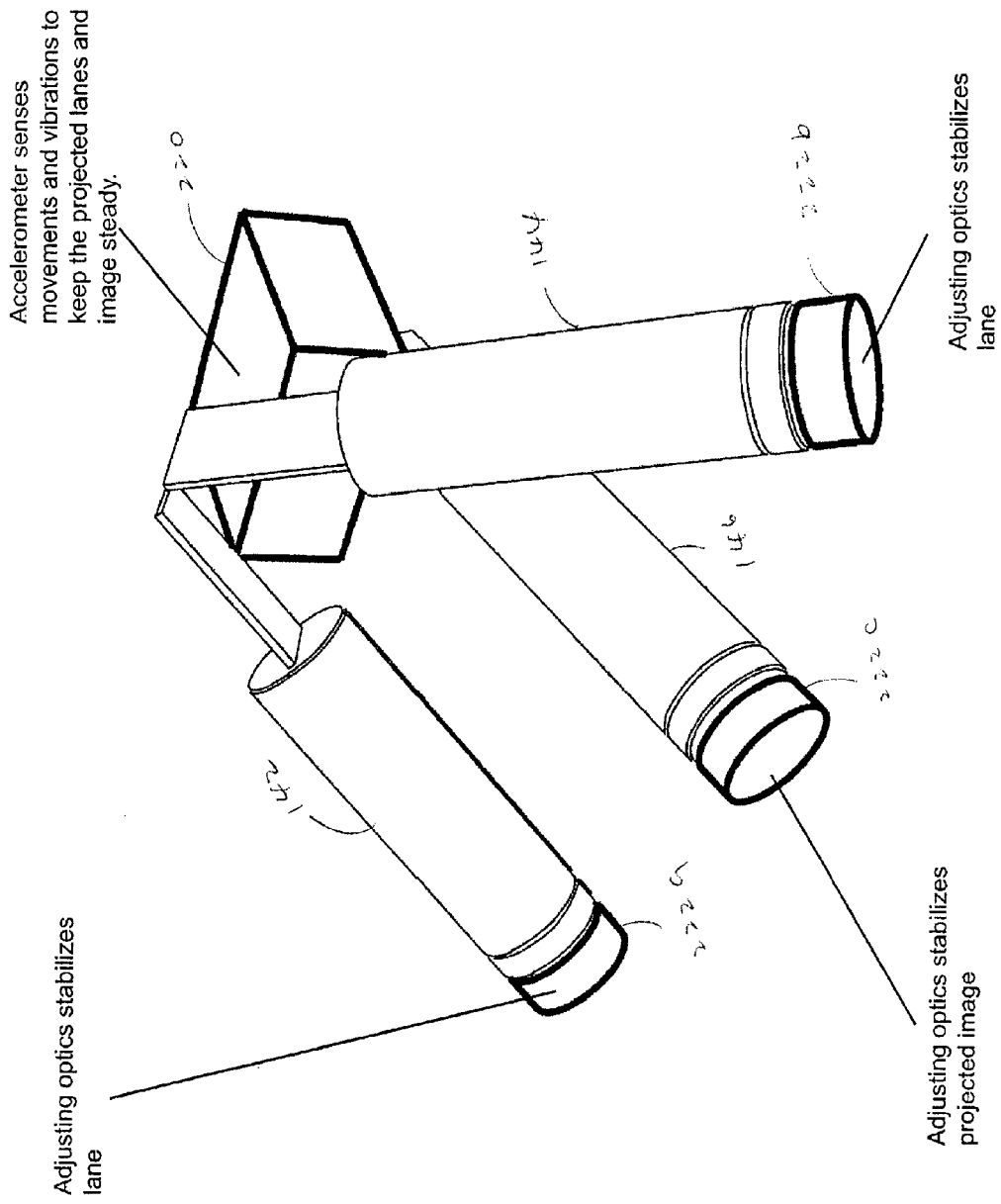
FIG. 9 is a diagram of an example safety light device that includes an accelerometer and movement compensation optics.

Referring to FIG. 9, in some implementations, the safety light device 100 includes an accelerometer 220 that senses movements and vibrations of the safety light device 100, and controls optics 222a, 222b, and 222c to compensate the motion and keep the projected bike lane boundaries 106, 108 and image 110 steady. This way, even if the bicycle 104 is traveling on a bumpy road, the projected images will remain relatively steady.

Figure 11:
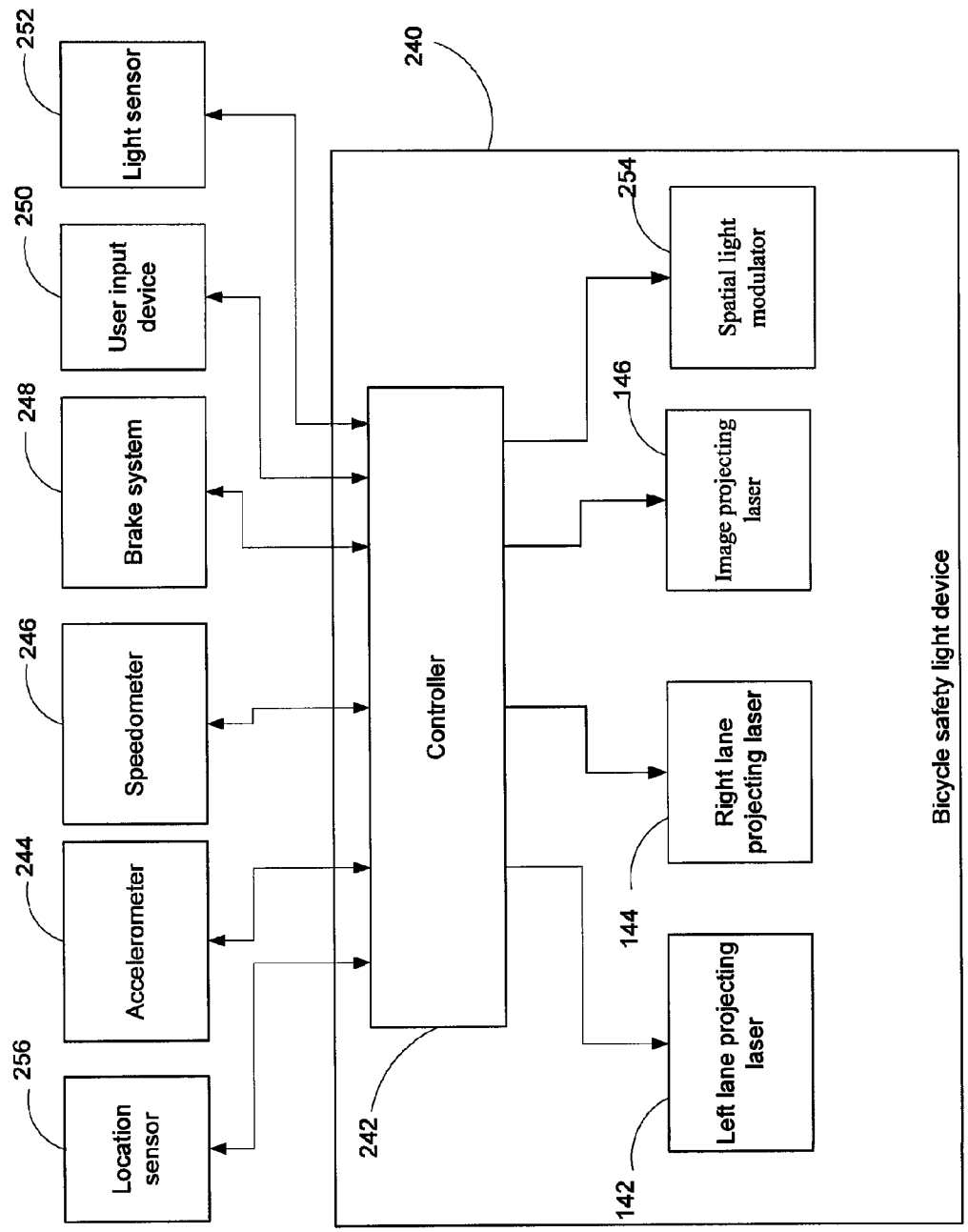
FIG. 11 is a block diagram of an example bicycle safety light device and various peripheral devices.

FIG. 11 is a block diagram of an example bicycle safety light device 240 that has a controller 242 to control the projected left bike lane boundary 106, the projected right bike lane boundary 108, and the projected bike icon image 110 based on sensor input indicating a condition of the bicycle 104. The controller 242 can be, e.g., a microcontroller.

In this example, the controller 242 controls the left lane projecting laser 142 and the right lane projecting laser 144 to control the projected left bike lane boundary 106 and the projected right bike lane boundary 108, respectively. The controller 242 controls the image projecting laser 146 and a spatial light modulator 254 to control the projected image 110. The controller 242 receives signals from various sensors or devices of the bicycle 104, such as a location sensor 256, an accelerometer 244, a speedometer 246, a brake system 248, a user input device 250, and a light sensor 252. The controller 242 may control additional actuators not shown in the figure, such as actuators that can adjust the projection directions of the lasers.

The location sensor 256 can determine location based on global positioning system (GPS) signals, Wi-Fi signals, or mobile phone network tower signals. The accelerometer 244 can be a single-axis or multi-axis device, can detect the magnitude and direction of acceleration, and can be used to sense orientation of the bicycle 104. The speedometer 246 can measure the speed of the bicycle 104. The brake system 248 can generate a signal to the controller 242 when the brake has been applied by the bike rider. The user input device 250 can include levers, switches, buttons, or keypads that allows the bike rider to send commands to the controller 242. The light sensor 252 is oriented to detect light projected from behind the bicycle 104.

For example, the user input device 250 can include two parts, one mounted on the left handle and the other mounted on the right handle, that allow the bike rider to activate left and right turning signals. When the rider activates the left turn signal, the controller may blink the left lane projecting laser 142 to cause the projected left bike lane boundary to blink. Similarly, when the rider activates the right turn signal, the controller may blink the right lane projecting laser 142 to cause the projected right bike lane boundary to blink.

In some examples, the controller 242 may automatically blink or increase the brightness of the projected left or right bike lane boundary 106, 108 in response to a signal from the accelerometer 244 indicating that the bicycle 104 has tilted left or right, respectively, beyond a threshold degree, such as 15 degrees. The controller 242 may automatically blink or increase the brightness of both the projected left and right bike lane boundaries 106, 108 in response to a signal from the speedometer 246 indicating that the bicycle 104 has a speed below a threshold value (e.g., 1 mile per hour) or to a signal from the accelerometer 244 indicating that the bicycle 104 is decelerating beyond a threshold rate (indicating, e.g., that the brake has been applied or the bicycle is going uphill and slowing down).

The controller 242 may automatically increase the brightness of the projected left and right bike lane boundaries 106, 108 and the projected bike lane icon 110 in response to a signal from the light sensor 252 indicating that light coming from the rear of the bicycle is beyond a threshold brightness so that the projected bike lane boundaries 106, 108 and the projected icon 100 are not drowned out by the headlights of vehicles behind the bicycle 104.

The controller 242 may change parameters of the left and right bike lane boundaries 106, 108 and the projected image 110 based on signals from the location sensor 256. For example, the controller 242 may change the pattern on the spatial light modulator 254 based on the location. The controller 242 may change the brightness of the projected bike lane boundaries and the projected image based on the location.

Figure 12:
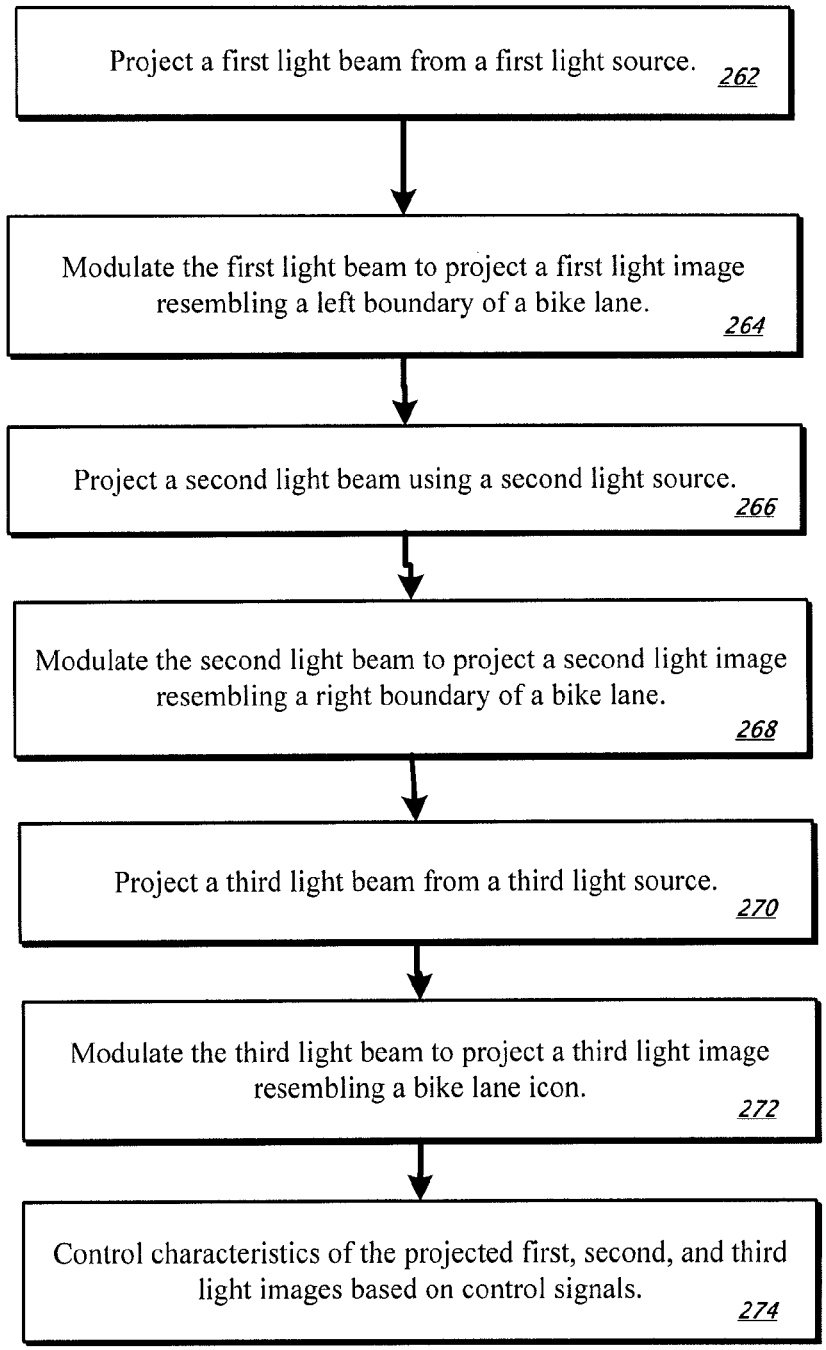
FIG. 12 is a flow diagram of an example process.

FIG. 12 is a flow diagram of an example process 260 for projecting light images onto a road surface from a bicycle to enhance safety of the bike rider. The process 260 can include, e.g., projecting a first light beam from a first light source (262), modulating the first light beam to project a first light image resembling a left boundary of a bike lane (264), projecting a second light beam using a second light source (266), modulating the second light beam to project a second light image resembling a right boundary of a bike lane (268), projecting a third light beam from a third light source (270), modulating the third light beam to project a third light image resembling a bike lane icon (272), and controlling characteristics of the projected first, second, and third light images based on control signals (274).

For example, the first, second, and third light sources can be the lane projecting lasers 142 and 144 and the image projecting laser 146 of FIG. 3. Controlling characteristics of the projected first, second, and third light images based on control signals can include causing the projected first, second, and third light images to blink or change brightness, or to change the patterns of the projected light images.

Although some examples have been discussed above, other implementations and applications are also within the scope of the following claims. For example, the bicycle safety light device 100 may project the left and right bike lane boundaries 106, 108 without projecting the bike lane icon 110. Even without the bike lane icon 110, the two bike lane boundaries 106 and 108 provide a more easily recognizable visual cue to vehicle drivers, as compared to a single projected light line, increasing the safety of the bike rider. The projecting lasers 142, 144, and 146 can be replaced with other types of light sources, such as light emitting diodes or krypton bulbs. The mounting bracket 132 can be replaced with other mechanisms for coupling the safety light device 100 to the bicycle 104, such as a clip or a screw mount. A coupling mechanism may be provided to attach the safety light device 100 to a bike handle. An accessory may be provided to attach the safety light device 100 to non-standard bicycles, such as a recumbent bicycle.

The safety light device 100 can be used in other types of vehicles, such as electric bikes, scooters, or golf cars to project vehicle lane boundaries. The safety light device 100 can have a mounting device suitable for mounting to other types of vehicles or devices, e.g., a child's bicycle, a wheel chair, a helmet, a pannier rack, a skateboard, or a tricycle. The safety light device 100 can be used in personal transportation machines, e.g., Segway human transporters or Personal Urban Mobility & Accessibility (PUMA) machines to project lane boundaries. The personal transportation machines may have built-in location sensors (e.g., GPS systems). The safety light device 100 can be coupled to the built-in location sensor and project different images or adjust various parameters (e.g., brightness) of the images at different locations.

The safety light device 100 may have a tilt safety sensor to detect the amount of tilt, and turn off the laser beams when the device 100 is tilted beyond a certain angle. This avoids the device 100 from projecting laser beams toward the eyes of vehicle drivers or pedestrians when the bicycle 104 is making sharp turns. The safety light device 100 may have mechanisms for adjusting the angle, width, or length or some other dimension of the lane boundaries 106, 108 and/or the icon 110. This allow users to adjust the projected bike lane to fit a particular bike size. For example, when the safety light device 100 is mounted on a lower bicycle, the projection angle for the lane boundary 106 or 108 relative to the vertical direction may be adjusted larger, as compared to when the safety light device 100 is mounted on a higher bicycle.

The light sources (e.g., lasers and LEDs) may have an energy saving mode in which the lights blink instead of remaining on all the time to conserve energy. The safety light device may have a USB (or micro USB) charging receptacle to allow charging the battery 132 through a USB port of another device (e.g., computer). There may be a fuel gauge for determining the battery level. For example, in one mode of operation, the LEDs 148 may indicate the power level in the battery, such as using one LED to represent low battery and five LEDs to represent full battery.

A safety light as described herein can be used with, and/or integrated into, other narrow vehicles, such as scooters, motorcycles, electric bicycles, mopeds, Segways. The safety light can also be used with, or integrated into off-road vehicles, such as lawn tractors, snow blowers, snow mobiles, and the like.

Having described the invention, and a preferred embodiment thereof, what is claimed as new and secured by letters patent is:

1. A bicycle safety light apparatus comprising:
   a first light source to emit a first light beam;
   a first light modulator to modulate the first light beam to project a first light image resembling a left boundary of a bike lane;
   a second light source to emit a second light beam;
   a second light modulator to modulate the second light beam to project a second light image resembling a right boundary of a bike lane; and
   a housing to support the first and second light sources and the first and second light modulators.

2. The apparatus of claim 1, further comprising a mounting device for mounting the housing to a bicycle.

3. The apparatus of claim 1, wherein the housing is formed from a portion of a bicycle superstructure.

4. The apparatus of claim 1, further comprising a stabilizer to stabilize movements of the first and second light sources and the first and second light modulators to reduce movements of the projected left and right bike lane boundaries when the bicycle tilts at an angle relative to a vertical direction.

5. The apparatus of claim 4, in which the stabilizer causes the first and second light sources and the first and second light modulators to rotate about an axis to counteract the tilt of the bicycle.

6. The apparatus of claim 1, further comprising a third light source to emit a third light beam, and a third light modulator to modulate the third light beam to project a third light image resembling a bike lane icon.

7. The apparatus of claim 1, further comprising a third light source to emit a third light beam, and a third light modulator that is reconfigurable to modulate the third light beam to project a third light image representing a user-defined pattern.

8. The apparatus of claim 1, in which at least one of the first or second light modulators comprises a reflective surface having ridges to reflect the corresponding light beam to form the left or right bike lane boundary image.

9. The apparatus of claim 1, further comprising a location sensor to detect a location of the safety light apparatus, and a controller to control at least one of the first light source, the first light modulator, the second light source, or the second light modulator to adjust a parameter of the first light image or the second light image based on the location.

10. The apparatus of claim 1, further comprising a tilt safety sensor to sense an amount of tilt of the safety light apparatus and cause at least one of the first light source or the second light source to be dimmed or turned off when the safety light apparatus is tilted at an angle beyond a threshold value.

11. The apparatus of claim 1, further comprising a mechanism for adjusting at least one of a projection angle for the first light image, a length of the first light image, or a distance between the first and second light images.

12. The apparatus of claim 1, further comprising an accelerometer to detect movements of the bicycle, and a controller to control at least one of the projected left or right bike lane boundary based on outputs from the accelerometer.

13. The apparatus of claim 12, in which the controller blinks the projected left bike lane boundary when the accelerometer detects that the bicycle tilts left beyond a threshold degree.

14. The apparatus of claim 12, in which the controller blinks the projected right bike lane boundary when the accelerometer detects that the bicycle tilts right beyond a threshold degree.

15. The apparatus of claim 12, in which the controller increases the intensity of at least one of the projected left or right bike lane boundary when the accelerometer detects that the bicycle decelerates beyond a threshold rate.

16. The apparatus of claim 1, further comprising a controller to control at least one of the projected left or right bike lane boundary based on a signal indicating whether the bicycle has a speed above or below a threshold.

17. The apparatus of claim 16, in which the controller increases the brightness of at least one of the projected left or right bike lane boundary when the signal indicates that the bicycle has a speed below the threshold.

18. The apparatus of claim 1, further comprising a light sensor that senses light coming from behind the bicycle, and a controller to control at least one of the projected left or right bike lane boundary based on outputs from the light sensor.

19. The apparatus of claim 18, in which the controller increases the brightness of at least one of the projected left or right bike lane boundary when the light sensor senses light beyond a threshold brightness.

20. The apparatus of claim 1, further comprising a controller to cause the projected left bike lane boundary to blink or change brightness in response to a first control signal, and cause the projected right bike lane boundary to blink or change brightness in response to a second control signal.

21. The apparatus of claim 1, further comprising a user input device to generate a control signal, the user input device being configured to receive inputs from a rider of the bicycle.

22. An apparatus comprising:
a projector to project a first light image resembling a left boundary of a bike lane and a second light image resembling a right boundary of a bike lane; and
a controller to control the projected left bike lane boundary and the right bike lane boundary based on sensor input indicating a condition of a bicycle to which the apparatus is mounted.

23. The apparatus of claim 22, in which the controller blinks or changes brightness of the projected left or right bike lane boundary in response to sensor input indicating that the bicycle tilts left or right, respectively, beyond a threshold degree.

24. The apparatus of claim 22, in which the controller blinks or changes brightness of both the projected left and right bike lane boundaries in response to sensor input indicating that the bicycle has a speed below a threshold or is decelerating beyond a threshold rate.

25. The apparatus of claim 22, in which the controller increases a brightness of at least one of the projected left or right bike lane boundary in response to sensor input indicating that light coming from the rear of the bicycle is beyond a threshold brightness.

26. The apparatus of claim 22, further comprising:
an accelerometer;
a speedometer;
a location sensor;
a light sensor.

27. The apparatus of claim 22, further comprising a bicycle superstructure.

28. An apparatus comprising:
light sources to emit light beams;
means for modulating the light beams to project a first light image resembling a left boundary of a bike lane and a second light image resembling a right boundary of a bike lane; and
a housing to support the light sources and the modulating means.

29. The apparatus of claim 28, further comprising a stabilizer to stabilize movements of the light sources and the modulating means to reduce movements of the left and right boundaries of the projected bike lane when the bicycle tilts at an angle relative to a vertical direction.

30. The apparatus of claim 28, in which the modulating means modulates the light beams to project a third light image resembling a bike lane icon.

* * * * *